United States Patent
Jennison

(10) Patent No.: US 8,985,934 B1
(45) Date of Patent: Mar. 24, 2015

(54) BUCKET LIFT RING FOR LOADER AND BACKHOE BUCKETS

(71) Applicant: SR&D, Inc., Burlington, IA (US)

(72) Inventor: Sam Jennison, Burlington, IA (US)

(73) Assignee: SR&D, Inc., Burlington, IA (US)

( * ) Notice: Subject to any disclaimer, the term of this patent is extended or adjusted under 35 U.S.C. 154(b) by 0 days.

(21) Appl. No.: 14/045,023

(22) Filed: Oct. 3, 2013

Related U.S. Application Data

(60) Provisional application No. 61/709,818, filed on Oct. 4, 2012.

(51) Int. Cl.
  *B60D 1/52* (2006.01)
  *E02F 3/96* (2006.01)
  *B66F 9/075* (2006.01)

(52) U.S. Cl.
  CPC ............ *E02F 3/962* (2013.01); *B66F 9/075* (2013.01); *B60D 1/52* (2013.01); *Y10S 37/903* (2013.01)
  USPC .............................. 414/724; 37/403; 37/903

(58) Field of Classification Search
  CPC ........... E02F 3/404; E02F 3/962; E02F 3/963; Y10S 37/903; Y10S 414/125; B60D 1/52
  USPC ............. 37/403, 903; 172/778; 414/724, 815, 414/912
  See application file for complete search history.

(56) References Cited

U.S. PATENT DOCUMENTS

| | | | |
|---|---|---|---|
| 2,838,856 A | 6/1958 | Buisse | |
| 3,743,358 A | 7/1973 | Guest | |
| 3,908,844 A | 9/1975 | Duffield | |
| D267,646 S | 1/1983 | McCarron | |
| 4,561,199 A | 12/1985 | Lockwood | |
| 4,850,789 A * | 7/1989 | Zimmerman | 414/703 |
| 5,097,609 A | 3/1992 | Swaggert | |
| D336,476 S | 6/1993 | Garman | |
| 5,570,897 A | 11/1996 | Wass | |
| 5,707,168 A | 1/1998 | Sharon | |
| 5,833,008 A | 11/1998 | Reed et al. | |
| 5,987,787 A | 11/1999 | Mack | |
| 6,022,184 A | 2/2000 | Friedland | |
| 6,085,447 A | 7/2000 | Rose | |
| 6,135,701 A * | 10/2000 | Galloway, Sr. | 414/607 |
| D444,746 S | 7/2001 | Wherley | |
| 6,487,799 B2 | 12/2002 | Burk | |
| 6,493,967 B2 | 12/2002 | Holmes et al. | |
| 6,536,607 B1 * | 3/2003 | Knoll et al. | 211/41.14 |
| 6,928,758 B1 | 8/2005 | Stout | |
| 7,523,920 B2 | 4/2009 | Semke | |
| 8,109,709 B1 | 2/2012 | Gaetze | |

* cited by examiner

*Primary Examiner* — Saul Rodriguez
*Assistant Examiner* — Brendan Tighe
(74) *Attorney, Agent, or Firm* — Simmons Perrine Moyer Bergman PLC

(57) ABSTRACT

A removable bucket ring attachment configured to slide over a terminal bottom front end of a bucket on a loader or a backhoe; where the bucket ring attachment has a pair of parallel plates closed at one end and open at an opposing end.

18 Claims, 4 Drawing Sheets

BUCKET LIFT RING FOR LOADER AND BACKHOE BUCKETS

CROSS REFERENCE

The present invention claims the benefit of the provisional patent application, having Ser. No. 61/709,818, filed on Oct. 4, 2012, and entitled Bucket Ring by Sam Jennison. This application is hereby incorporated herein in its entirety by this reference.

FIELD OF THE INVENTION

The present invention generally relates to loaders and backhoes, and even more particularly relates to methods and systems for quickly using loaders and backhoes to lift objects.

BACKGROUND OF THE INVENTION

In the past, operators of tractors with front end loaders and backhoes have used the hydraulic lift systems on these and similar machines to pick up heavy objects.

While these loader buckets and backhoe buckets have provided much utility for lifting, they also have significant drawbacks.

Typically, one end of a chain (or other elongated flexible member) might be wrapped around a bucket to "secure" the chain to the bucket, and the other end of the chain is used for attachment to the object to be lifted. This wrapping of the chain around the bucket is often problematic for several reasons. First of all, much chain is required to wrap around a typical loader bucket. Secondly, the chain is often not secured in a single location on the bucket, causing slipping and the frustration and danger that can be associated with such slipping.

Consequently, there exists a need for improvement in loader and backhoe systems for use as a crane, or for other lifting of heavy objects.

SUMMARY OF THE INVENTION

It is an object of the present invention to provide low cost system for lifting heavy objects with a loader bucket or backhoe bucket and a chain.

It is a feature of the present invention to utilize a slide-on, quick-attaching bucket ring.

It is an advantage of the present invention to reduce the time required to secure a lifting chain to a loader bucket.

It is another feature of the present invention to include a rotating threaded retaining stud.

It is another advantage of the present invention to minimize play at the point of attachment of the bucket ring and the bucket.

It is yet another feature of the present invention to provide a cost and weight saving dual-purpose handle and chain receiving ring.

It is yet another advantage of the present invention to simultaneously reduce cost and make the bucket ring lighter, and therefore easier to handle during attachment, removal and storage.

The present invention is an apparatus and method for providing a quick and secure attachment of an elongated flexible member to a bucket which is designed to satisfy the aforementioned needs, provide the previously stated objects, include the above-listed features and achieve the already articulated advantages. The present invention is carried out in an "efficient chain wrapped bucket slack-less" manner in a sense that the chain slack and attachment play, as well as the time required to secure the chain to the bucket, has been greatly reduced.

Accordingly, the present invention is a bucket ring which is slid over the front edge of a bucket.

BRIEF DESCRIPTION OF THE DRAWINGS

The invention may be more fully understood by reading the foregoing description of the preferred embodiments of the invention, in conjunction with the appended drawing wherein.

DETAILED DESCRIPTION

Figure 1:
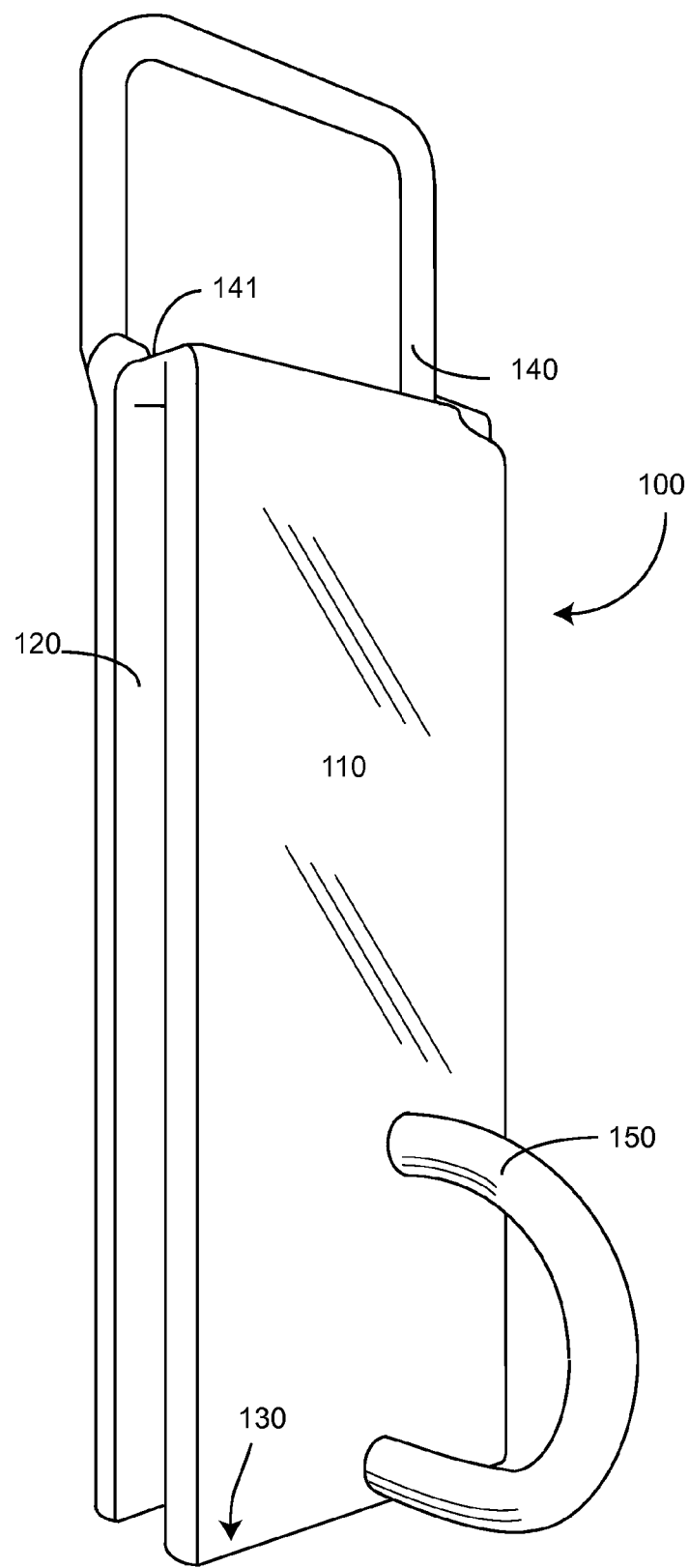
FIG. 1 is a simplified perspective view of one embodiment of the present invention.

Now referring to the drawings, wherein like numerals refer to like matter throughout, and more particularly now referring to FIG. 1, there is shown a system of the present invention, generally designated 100, having an outer plate 110 and a spaced apart, but substantially parallel, inner plate 120, where the space therebetween is sized and configured to receive therein, and to slide over, a terminal bottom front end of a bucket of the type used on a front end loader on a tractor, or on a backhoe or other loader or digger machines. A chain receiving ring 150 is shown disposed on an outer surface of outer plate 110, so that a chain or other elongated flexible member, such as a wire, rope, string of links or clips and pins or devises etc., can be used to support an object. Chain receiving ring 150 is shown disposed at an open end 130 of bucket ring attachment 100. Opposite open end 130 is closed end 141, which may be a separate piece of material or a bent section of matter. In one embodiment, outer plate 110, inner plate 120 and closed end 141 could all be portions of a single bent piece of metal. In other embodiments, they may be distinct pieces connected together. The material used for the bucket ring attachment may be all the same or different, they may be steel or other suitable material. Outer plate 110 and inner plate 120 in one embodiment may be substantially parallel, but in other embodiments they may be non-parallel and may be configured to have a smaller separation near the closed end 141 than at the open end 130. Also shown is a handle 140.

Figure 2:
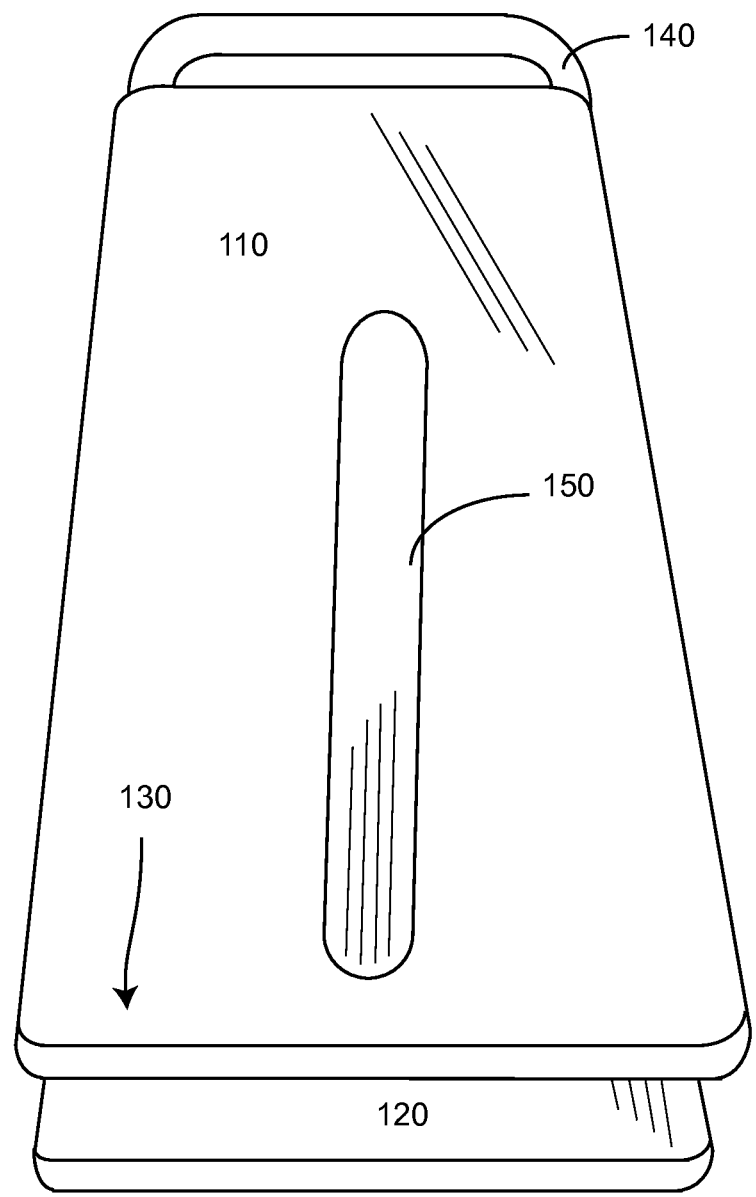
FIG. 2 is an alternate angle perspective view of the bucket ring attachment of FIG. 1.

FIG. 2 shows a slightly different angle view of the bucket ring attachment 100 of FIG. 1.

Figure 3:
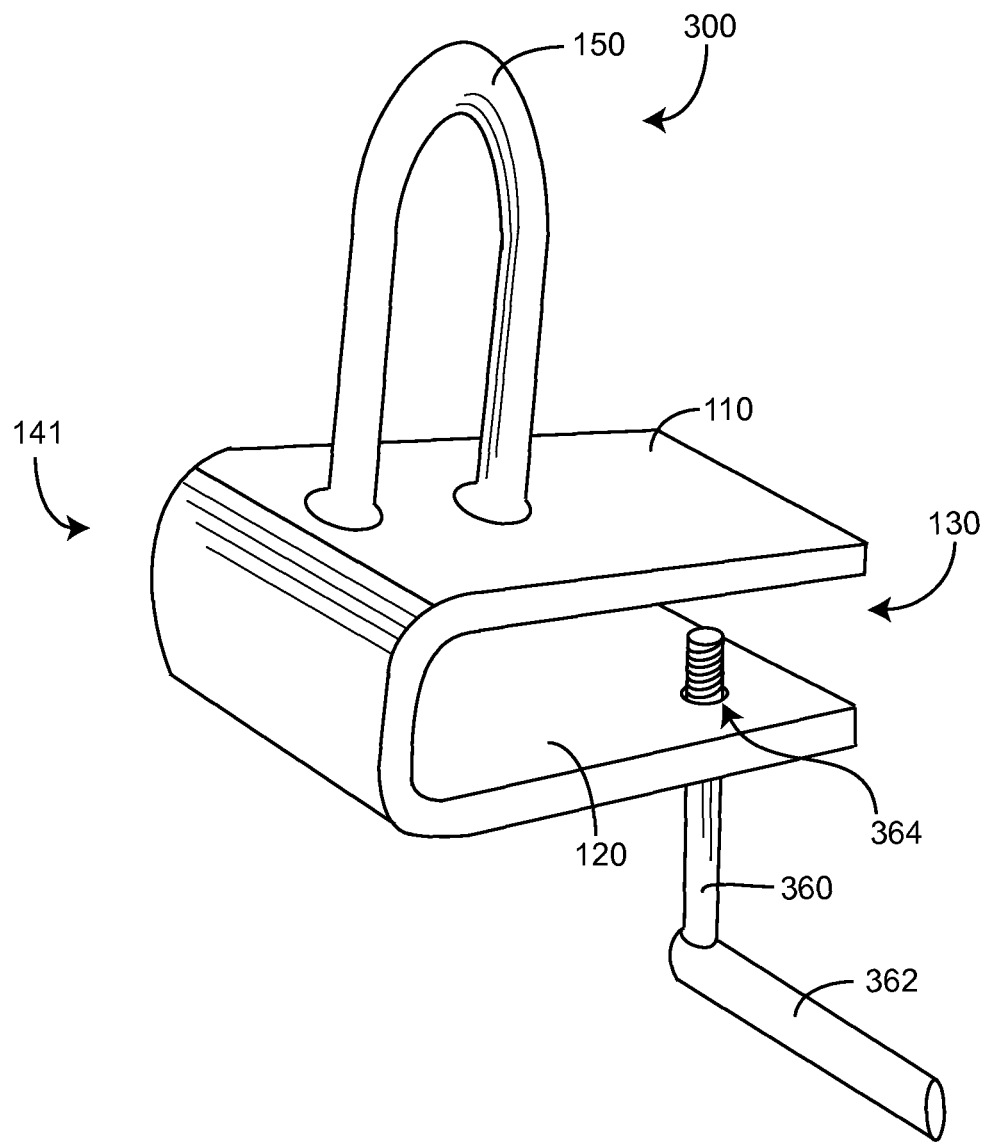
FIG. 3 is a perspective view of an alternate embodiment of the present invention with a retaining stud.

Now referring to FIG. 3, there is shown an alternate embodiment of the present invention, generally designated 300. The main difference from FIGS. 1 and 2 is the chain receiving ring 150 is located near the closed end 141, the handle 140 is omitted as the chain receiving ring 150 can be used as a handle and a chain receiving ring. Additionally, there is shown a retaining stud 360, which may be a threaded rod which can be advanced through the threaded retaining stud receiving hole 364 in inner plate 120 by turning the retaining stud handle portion 362. Retaining stud 360 is used to secure the bucket ring attachment 300 to a bucket and thereby reduce the play in the connection therebetween and reduce problems associated with relative movement therebetween. Instead of the retaining stud 360 and retaining stud receiving hole 364 combination, a variable insertion length pin with predetermined insertion lengths corresponded to cross pin retaining clips etc. could be used in some applications. Still outer suitable means for reducing play in the bucket ring attachment, and the bucket combination could be utilized depending upon particular needs of particular applications.

Figure 4:
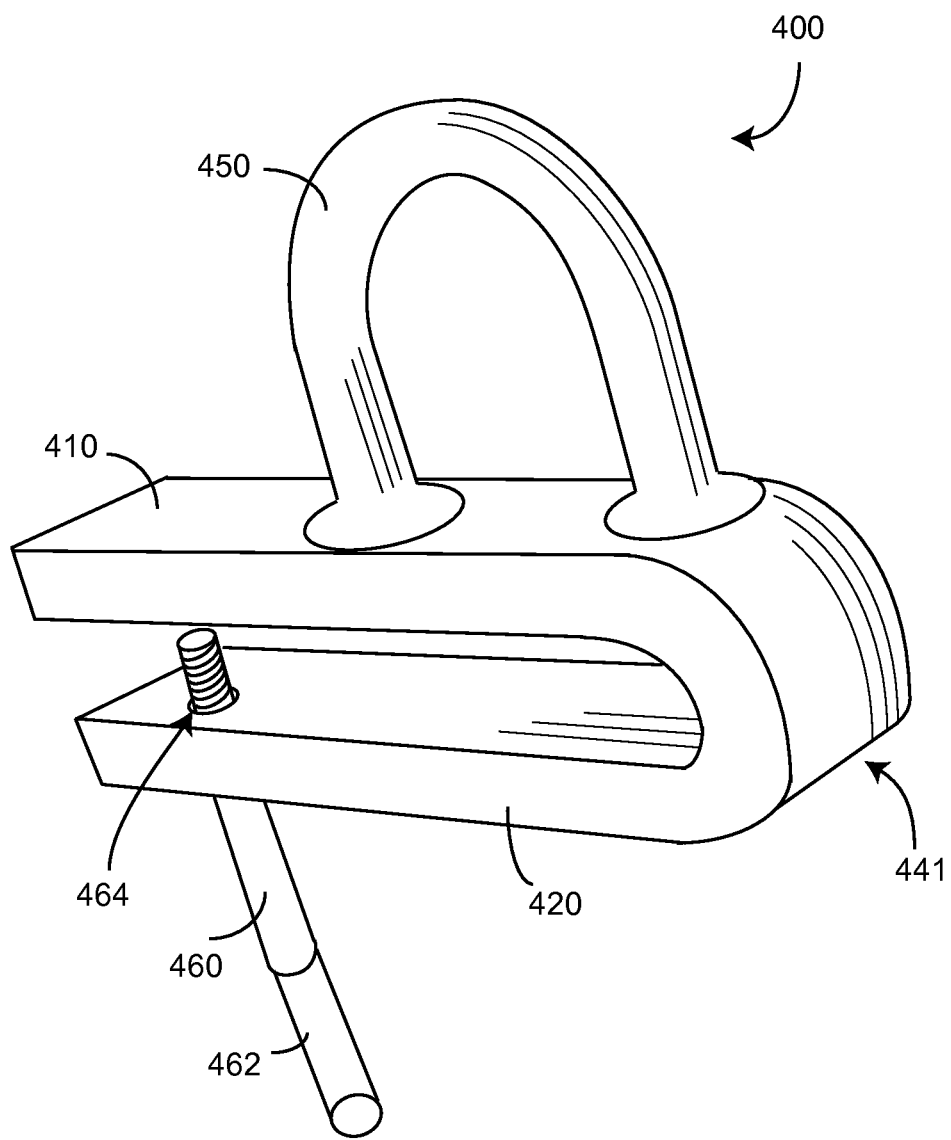
FIG. 4 is a perspective view of an alternate industrial embodiment of the present invention.

Now referring to FIG. 4, there is shown an industrial or heavy duty (10,000 lbs. maximum load rating) bucket ring attachment 400, which has a shape very similar to FIG. 3, however, industrial outer plate 410 is a heavy duty plate portion and may be the same material as one made for FIG. 3, except that it is thicker. Or other material could be used as well. Industrial inner plate 420 is shown as an opposing plate portion that is bent to form a closed end 441. Industrial chain receiving ring 450 and industrial retaining stud 460, industrial retaining stud handle portion 462 and industrial retaining stud receiving hole 464 may have larger dimensions, but otherwise be similar in shape and function as the less heavy duty counterparts in FIG. 3.

In operation, the apparatus and method of the present invention could function as follows: a bucket ring attachment such as 100, 300, or 400 is slid over a terminal bottom front end of a bucket on a front end loader of a tractor or a backhoe or other bucket. A chain or other elongated flexible member is run through the chain receiving ring 150, or industrial chain receiving ring 450, and the chain is used to lift an object. If extra secure connections between the bucket ring attachment and the bucket is desired, then the retaining stud handle portion 362 or industrial retaining stud handle portion 462 can be turned to advance the retaining stud 360 or industrial retaining stud 460 through the threaded retaining stud receiving hole 364 or industrial retaining stud receiving hole 464, respectively, and contact the inside of the bucket, and thereby hold the bucket ring attachment securely in place. The process can be reversed. The chain receiving ring 150 can be used as a handle and could render the handle 140 unnecessary in many applications.

During lifting operations, ideally the terminal bottom front end of the bucket will be ideally pointed somewhat upward so that the bucket ring attachment is slid downwardly onto the bucket so that the terminal bottom front end of the bucket either contacts the closed end 141, or 441, or is restricted from further penetration into the bucket ring attachment (this may be due to an intentional non-parallel configuration of outer plate 110 and inner plate 120 and in the industrial version industrial outer plate 410 and industrial inner plate 420). The bucket ring attachment is held in place by gravity. In an alternate embodiment, where the bucket may be filled with matter, and tightening the industrial retaining stud handle portion 462 and retaining stud handle portion 362 could be difficult, the outer plate 110 and industrial outer plate 410 may have a retaining stud receiving hole and an industrial retaining stud receiving hole drilled therein to facilitate tightening of the bucket ring attachment from outside the bucket.

The above description describes the attachment of the bucket ring attachment to the terminal bottom front end of the bucket. It should be understood that this is an exemplary and possibly preferred placement. However, attachment to the top of the bucket or a side of the bucket could be desirable, in some particular situations.

It is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

I claim:

1. A system for lifting heavy items with a hydraulic bucket configured for scooping earth and loose bulk material, the system comprising:
  a bucket with a bucket bottom portion with a terminal bottom front end;
  a removable bucket ring attachment having: a front closed end and an opposing open end and further having an attachment width characteristic, an attachment length characteristic and an attachment thickness characteristic; wherein said removable bucket ring attachment comprises:
    an outside ring plate portion having a outer plate width characteristic, an outer plate length characteristic and an outer plate thickness characteristic;
    an inside plate portion having an inside plate width characteristic, an inside plate length characteristic and an inside plate thickness characteristic;
    wherein said outer plate width characteristic is substantially the same as said attachment width characteristic and said inside plate width characteristic;
    wherein said outer ring plate and said inner plate are substantially parallel and a plane defined by said outer plate width characteristic and said outer plate length characteristic faces an outside surface of said bucket bottom portion;
    wherein said outer ring plate comprises:
    an outer ring plate bucket facing surface and an opposing parallel outer ring plate attachment surface, where said outer ring plate bucket facing surface is free of any protuberances thereon;
    a means for connecting the outside ring plate portion to the inside plate portion at one end so as to leave an opposing end open and configured to receive therein said terminal bottom front end, where said opposing end is said opposing open end;
    an outer plate free end distal to said means for connecting, where said outer plate free end is free of any protuberances thereon; and
    an elongated flexible member receiving ring disposed on and rigidly coupled only to said outer ring plate at a location which is between said front closed end and said opposing open end.

2. The system of claim 1 further comprising:
  a retaining stud receiving hole disposed in one of said outside ring plate portion and said inside plate portions;
  a retaining stud having a retaining stud handle portion and a retaining stud bucket mating free end, said retaining stud configured to advance through said retaining stud receiving hole when said retaining stud handle portion is rotated; and
  wherein said outer plate width characteristic has a smaller dimension than said outer plate length characteristic and larger dimension than said outer plate thickness characteristic.

3. The system of claim 2 wherein said elongated flexible member receiving ring is proximal to said means for connecting.

4. The system of claim 3 wherein said retaining stud receiving hole is disposed in said inner plate.

5. The system of claim 1 wherein said retaining stud receiving hole is disposed in said inner plate.

6. The system of claim 1 wherein said means for connecting comprises a separate piece of metal coupled to each of said outer ring plate and said inner plate.

7. The system of claim 1 wherein said connecting means is a portion of a single piece of bent metal, which also comprises said outer ring plate and said inner plate and wherein said outer plate thickness dimension is substantially the same as said inside plate thickness dimension.

8. The system of claim 1 wherein said elongated flexible member receiving ring is proximal to said means for connecting and a plane defined by said outer plate width characteristic and said outer plate length characteristic faces an outside surface of said bucket bottom portion.

9. The system of claim 1 further comprising a handle proximal to said means for connecting, and wherein said elongated flexible member receiving ring is proximal to said opposing end.

10. A method of lifting heavy items with a hydraulic bucket configured for scooping earth and loose bulk material, the method comprising the steps of:
   providing a bucket with a bucket bottom portion with a terminal bottom front end;
   providing a removable bucket ring attachment having: a front closed end and an opposing open end and further having an attachment width characteristic, an attachment length characteristic and an attachment thickness characteristic; wherein said removable bucket ring attachment comprises:
   an outside ring plate portion having a outer plate width characteristic, an outer plate length characteristic and an outer plate thickness characteristic;
      an inside plate portion having an inside plate width characteristic, an inside plate length characteristic and an inside plate thickness characteristic;
      wherein said outer plate width characteristic is substantially the same as said attachment width characteristic and said inside plate width characteristic;
      wherein said outer ring plate and said inner plate are substantially parallel and a plane defined by said outer plate width characteristic and said outer plate length characteristic faces an outside surface of said bucket bottom portion;
      wherein said outer ring plate comprises:
      an outer ring plate bucket facing surface and an opposing parallel outer ring plate attachment surface, where said outer ring plate bucket facing surface is free of any protuberances thereon;
      a means for connecting the outside ring plate portion to the inside plate portion at one end so as to leave an opposing end open and configured to receive therein said terminal bottom front end, where said opposing end is said opposing open end;
      an outer plate free end distal to said means for connecting, where said outer plate free end is free of any protuberances thereon; and
      providing an elongated flexible member receiving ring disposed on and rigidly coupled only to said outer ring plate at a location which is between said front closed end and said opposing open end;
   placing said removable bucket ring attachment on said bucket;
   coupling a first end of an elongated flexible member to said elongated flexible member receiving ring;
   coupling a second end of said elongated flexible member to an object to be lifted; and
   lifting said object by raising said bucket.

11. The method of claim 10 further comprising the steps of:
   providing a retaining stud receiving hole disposed in one of said outside ring plate portion and said inside plate portions;
   providing a retaining stud having a retaining stud handle portion and a retaining stud bucket mating free end, said retaining stud configured to advance through said retaining stud receiving hole when said retaining stud handle portion is rotated; and
   rotating said retaining stud handle portion so that said retaining stud bucket mating free end contacts said bucket and helps secure said removable bucket ring attachment to said bucket.

12. The method of claim 10 wherein said retaining stud receiving hole is disposed in said inner plate.

13. The method of claim 11 wherein said elongated flexible member receiving ring is proximal to said means for connecting, and said elongated flexible member is a chain.

14. The method of claim 10 wherein said outer ring plate and said inner plate are substantially parallel and a plane defined by said outer plate width characteristic and said outer plate length characteristic faces an outside surface of said bucket bottom portion.

15. The method of claim 10 wherein said means for connecting comprises a separate piece of metal coupled to each of said outer ring plate and said inner plate.

16. The method of claim 10 wherein said connecting means is a portion of a single piece of bent metal, which also comprises said outer ring plate and said inner plate and a plane defined by said outer plate width characteristic and said outer plate length characteristic faces an outside surface of said bucket bottom portion.

17. The method of claim 10 wherein said elongated flexible member receiving ring is proximal to said means for connecting.

18. The method of claim 10 further comprising a handle proximal to said means for connecting, and wherein said elongated flexible member receiving ring is proximal to said opposing end.

* * * * *